(12) United States Patent
Nakamura

(10) Patent No.: US 6,867,757 B1
(45) Date of Patent: Mar. 15, 2005

(54) DISPLAY DEVICE, PORTABLE ELECTRONIC DEVICE AND METHOD OF CONTROLLING DISPLAY DEVICE

(75) Inventor: Taisuke Nakamura, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/487,330

(22) Filed: Jan. 19, 2000

(30) Foreign Application Priority Data

Jan. 20, 1999 (JP) .......................................... 11/012320

(51) Int. Cl.[7] ................................................ G09G 3/32
(52) U.S. Cl. ............................ 345/83; 345/88; 345/90; 345/211; 345/690; 315/291; 349/70
(58) Field of Search ................................ 345/3, 87–90, 345/211–214, 690, 102, 52, 82–84, 98, 604, 694, 696; 315/291; 349/70, 71, 77; 455/566, 572, 574, 575

(56) References Cited

U.S. PATENT DOCUMENTS

| | | | |
|---|---|---|---|
| 4,278,917 A | | 7/1981 | Kobori |
| 5,122,791 A | * | 6/1992 | Gibbons et al. .............. 348/95 |
| 5,420,482 A | * | 5/1995 | Phares ......................... 315/292 |
| 5,724,062 A | * | 3/1998 | Hunter ........................ 345/102 |
| 5,767,837 A | * | 6/1998 | Hara ............................ 345/22 |
| 5,886,474 A | * | 3/1999 | Asai et al. ............... 315/169.1 |
| 5,998,928 A | * | 12/1999 | Hipp ........................ 307/10.8 |
| 6,016,038 A | * | 1/2000 | Mueller et al. ............. 315/291 |
| 6,028,597 A | * | 2/2000 | Ryan et al. .................. 345/211 |
| 6,115,016 A | * | 9/2000 | Yoshihara et al. .......... 345/102 |
| 6,150,774 A | * | 11/2000 | Mueller et al. ............. 315/291 |
| 6,160,596 A | * | 12/2000 | Sylvester et al. .............. 349/61 |
| 6,313,816 B1 | * | 11/2001 | Kojima et al. ............... 345/690 |
| 6,317,138 B1 | * | 11/2001 | Yano et al. .................. 345/589 |
| 6,377,236 B1 | * | 4/2002 | Karamoto ................... 345/102 |
| 6,400,101 B1 | * | 6/2002 | Biebl et al. ............. 315/185 R |

FOREIGN PATENT DOCUMENTS

| | | |
|---|---|---|
| EP | 0 668 701 | 8/1995 |
| EP | 0 967 590 | 12/1999 |
| GB | 2 337 354 | 11/1999 |
| JP | 62-117481 | 5/1987 |
| JP | 4-51218 A | 2/1992 |
| JP | 4-51218 | 2/1992 |
| JP | 4-359292 | 12/1992 |
| JP | 5-127635 | 5/1993 |
| JP | 5-265403 A | 10/1993 |
| JP | 5-265403 | 10/1993 |
| JP | 6-19425 | 1/1994 |
| JP | 6-84491 | 12/1994 |
| JP | 6-84491 U | 12/1994 |
| JP | 7-56528 A | 3/1995 |
| JP | 7-56528 | 3/1995 |
| JP | 7-281647 | 10/1995 |
| JP | 10-45475 A | 5/1998 |
| JP | 10-145475 | 5/1998 |
| JP | 11-266295 | 9/1999 |

* cited by examiner

Primary Examiner—Henry N. Tran
(74) Attorney, Agent, or Firm—Sughrue Mion, PLLC

(57) ABSTRACT

Current flowing through a plurality of light emission diodes is individually controlled, thereby an image with a desired color is displayed according to color lights emitted from the light emission diodes. A sum of current flowing through the light emission diodes is maintained at a predetermined current, thereby brightness of the image is maintained at a predetermined brightness.

10 Claims, 5 Drawing Sheets

DISPLAY DEVICE, PORTABLE ELECTRONIC DEVICE AND METHOD OF CONTROLLING DISPLAY DEVICE

BACKGROUND OF THE INVENTION

1. Field of the Invention

The present invention relates to a display device, a portable electronic device and a method of controlling a display device, in particular to a back-light display device, a portable electronic device and a method of controlling a display device capable of developing a desired color for display.

2. Description of the Related Art

A conventional red (R), green (G) and blue (B) back-light display is disclosed in Japanese Patent Laid-Open No. 7-281647.

This conventional RGB back-light display intends to avoid degradation of image quality resulting from a color fringe or after-image. The color fringe or after-image, for example, may arise when red (R) and green (G) colors intermingle with each other by failing to smoothly switch to a green image from a red image on the same pixel.

In this conventional RGB back-light display, color data written in advance in a memory and having a duration (for example 16 ms) equal to one frame are compressed so as to have a duration (for example 2.6 ms) short of one frame duration and then the compressed data is transferred to individual pixel areas. Light sources corresponding with images conveyed by the compressed data are turned on in synchrony with the compressed data reading time (for example 2.6 ms) as the blanking time. The remaining hold time (for example 13.4 ms) is used as the effective illumination time for display.

With this method, although an image depicted on the display device is turned off via a specified signal during the blanking time (2.6 ms), the dot state of this image just turned off is still held during the holding time (that is, 13.4 ms) on the display with declination of its intensity by a memorizing activity of liquid crystal. In the next frame, when depiction of an image of a different color is required, the foregoing dot state of liquid crystal declines sufficiently to allow the smooth switching to the image of the different color. This enables the smooth and swift switching of multiple color images. Moreover, the intensity of the image brightness is not controlled in this conventional RGB back-light display.

SUMMARY OF THE INVENTION

It is therefore an object of the present invention to provide a back-light display device, a portable electronic device and a method of controlling a display device capable of maintaining intensity of brightness regardless of a displayed color.

In order to achieve the above object, a display device according to the present invention comprises a plurality of light emitters each of said light emitters emitting a light different in color from other of said light emitters, a power source for supplying power to the light emitters, and a controller for controlling a current flowing through at least one of the light emitters such that a sum of currents flowing through the light emitters is maintained at a predetermined value.

In order to achieve the above object, a portable electronic device having a display device according to the present invention comprises a first light emitter for emitting a first color light, a second light emitter for emitting a second color light which is deferent from the first color light, a third light emitter for emitting a third color light which is deferent from the first color light and the second color light, whereby images of a fourth color are adapted to be displayed in cooperation with the first light emitter and the second light emitter, a power source for supplying voltage to the first light emitter, the second light emitter and the third light emitter, a controller for controlling currents flowing through the first light emitter, the second light emitter and the third light emitter, respectively, whereby a sum of the currents flowing through the first light emitter, the second light emitter and the third light emitter is maintained at a predetermined current value.

In order to achieve the above object, a method of controlling a display device according to the present invention comprises displaying an image on the display device, the image having a brightness, changing a color of the image displayed on the display device, and maintaining the brightness of the image at a predetermined value even if the color is changed.

Another method of controlling a display device, the device having a plurality of light emitters, according to the present invention comprises controlling current flowing through each of the light emitters individually, whereby an image with a desired color is displayed according to a light emitted from the light emitters, and maintaining a sum of currents flowing through the light emitters at a predetermined current value, whereby maintaining a brightness of the image at a predetermined brightness.

In order to achieve the above object, a method of controlling a portable electronic device, the device having a first light emitter for emitting a first color light, a second light emitter for emitting a second color light which is deferent from the first color light, a third light emitter for emitting a third color light which is deferent from the first color light and the second color light, whereby images with a fourth color are adapted to be displayed in cooperation with the first light emitter and the second light emitter, a power source for supplying voltage to the first light emitter, the second light emitter and the third light emitter, a controller for individually controlling currents flowing through the first light emitter, the second light emitter and the third light emitter according to the present invention, comprises changing the fourth color by controlling the current flowing through at least one of the first light emitter, the second light emitter and the third light emitter, and maintaining a sum of the currents flowing through the first light emitter, the second light emitter and the third light emitter at a predetermined current value.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, related back-light display devices will be described with respect to FIGS. 1 and 2, before preferred embodiments according to the present invention will be explained. The related back-light display devices are disclosed in Japanese Patent Laid-Open No. 11-266295, which has been filed by the assignee of the present invention. The related back-light display devices are provided with a portable electronic device such as a portable telephone.

Figure 1:
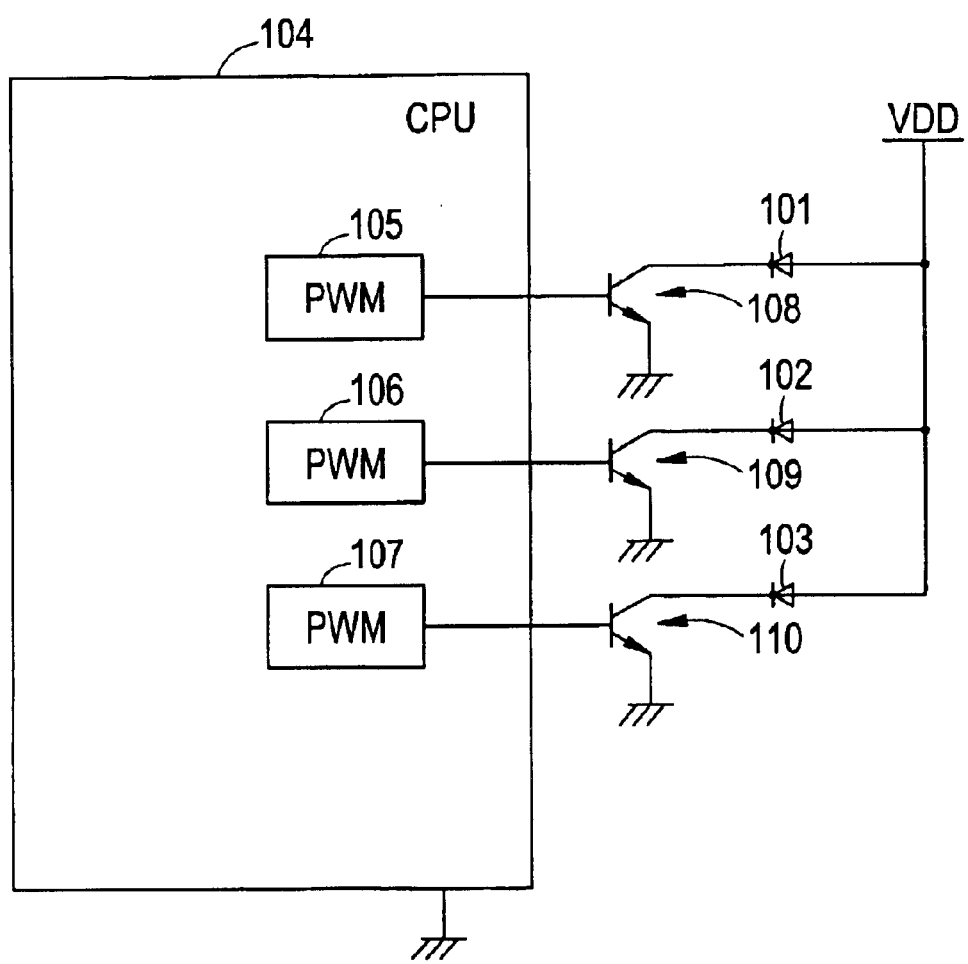
FIG. 1 is a circuit diagram of an embodiment of the related RGB back-light display device for the portable telephone.
Figure 2:
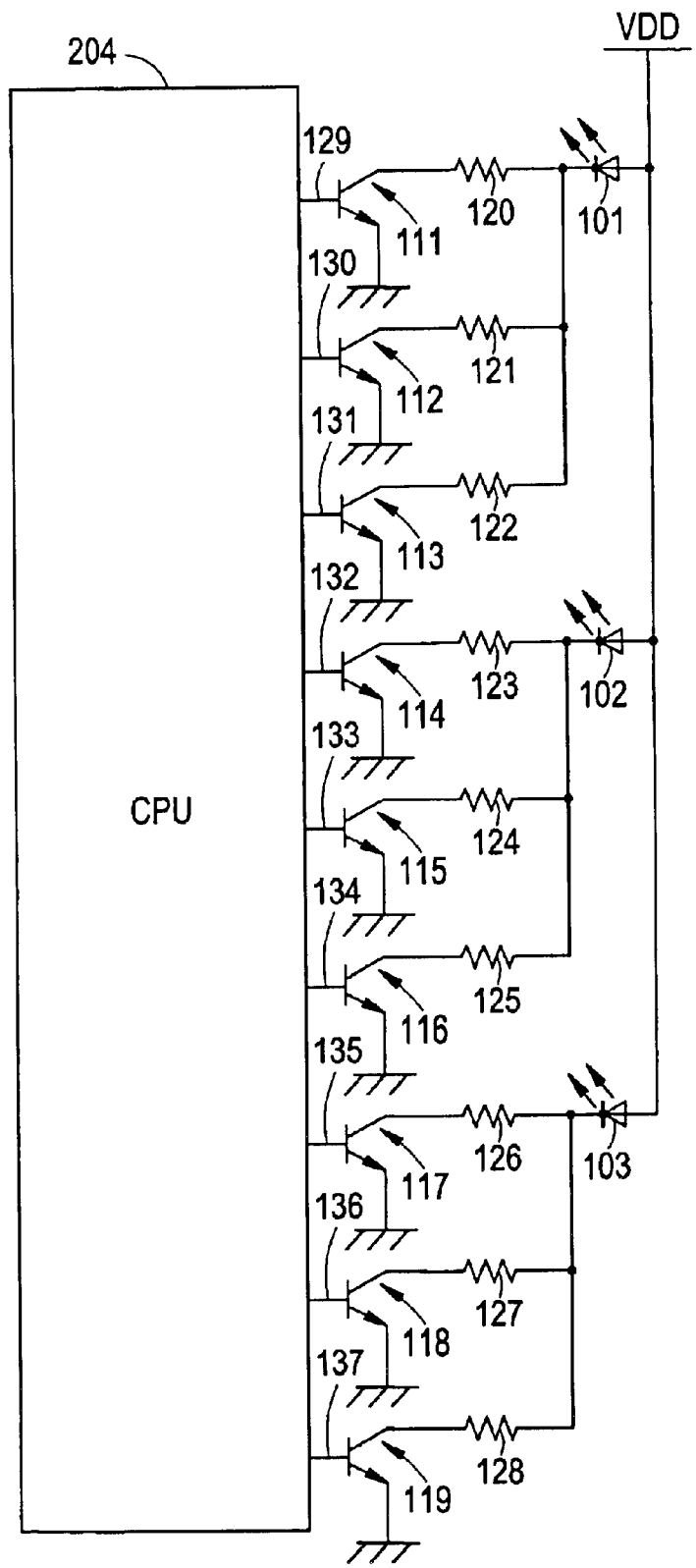
FIG. 2 is a circuit diagram of another embodiment of the related RGB back-light display device for the portable telephone.

Referring to FIG. 1, the related back-light display device has a red color light emitting diode (LED) 101, an LED driving transistor 108 to drive the red color LED 101, and a pulse width modulator circuit (PWM) 105 installed in a central processing unit (CPU) 104 to control the LED driving transistor 108. Further, the device has a green color light emitting diode (LED) 102, an LED driving transistor 109 to drive the green color LED 102, and a pulse width modulator circuit (PWM) 106 installed in the CPU 104 to control the LED driving transistor 109. The device includes a blue color light emitting diode (LED) 103, an LED driving transistor 110 to drive the blue color LED 103, and a pulse width modulator circuit (PWM) 107 installed in the CPU 104 to control the LED driving transistor 110.

In FIG. 1, the PWM 105 controls the LED driving transistor 108 to switch on the red color LED 101. The PWM 106 controls the LED driving transistor 109 to switch on the green color LED 102. The PWM 107 controls the LED driving transistor 110 to switch on the blue color LED 103. The red color, green color and blue color LEDs 101, 102 and 103 generate colors corresponding to three primary colors (RGB), respectively.

The PWM 105 is connected to the base terminal of the LED driving transistor 108. The PWM 106 is connected to the base terminal of the LED driving transistor 109. The PWM 107 is connected to the base terminal of the LED driving transistor 110. Then, it is possible to change average currents flowing through the red color, green color and blue color LEDs 101, 102 and 103 by means of the LED driving transistors 108, 109 and 110 respectively, by individually adjusting duty cycle or outputs from the PWMs 105, 106 and 107.

Through this arrangement, the related back-light display device can control currents flowing through the red color, green color and blue color LEDs 101, 102 and 103, and thus choose any color according to the user's liking as a back-light color of the portable telephone.

Next, another embodiment of the related back-light display device will be described with reference to FIG. 2. According to FIG. 2, the CPU 204 achieves an ON/OFF control of an LED driving transistor 111 via output from an output port 129. Similarly, the CPU 204 executes an ON/OFF control of an LED driving transistor 112 via output from an output port 130, and an ON/OFF control of an LED driving transistor 113 via output from an output port 131. The CPU 204 switches on any one of the LED driving transistors 111, 112 and 113. Current restricting resistances 120, 121 and 122 are chosen in such a way that their resistance values R120, R121 and R122 are set R120>R121>R122. When the CPU 204 turns on the LED driving transistor 111, the brightness of the red color LED 101 becomes the darkest state. When the CPU 204 switches on the LED driving transistor 113, the brightness of the red color LED 101 becomes the lightest state. When the CPU 204 turns on the LED driving transistor 112, the brightness of the red color LED 101 becomes an intermediate state between the above cases.

Similarly, the CPU 204 achieves an ON/OFF control of an LED driving transistor 114 via output from an output port 132. The CPU 204 also executes an ON/OFF control of an LED driving transistor 115 via output from an output port 133, and an ON/OFF control of an LED driving transistor 116 via output from an output port 134. The CPU 204 switches on any one of the LED driving transistors 114, 115 and 116. Current restricting resistances 123, 124 and 125 are chosen in such a way that their resistance values R123, R124 and R125 are set R123>R124>R125. When the CPU 204 turns on the LED driving transistor 114, the brightness of the green color LED 102 becomes the darkest state. When the CPU 204 switches on the LED driving transistor 115, the brightness of the green color LED 102 becomes the lightest state. When the CPU 204 turns on the LED driving transistor 116, the brightness of the green color LED 102 becomes an intermediate state between the above cases.

The CPU 204 achieves an ON/OFF control of an LED driving transistor 117 via output from an output port 135. Similarly, the CPU 204 executes an ON/OFF control of an LED driving transistor 118 via output from an output port 136, and an ON/OFF control of an LED driving transistor 119 via output from an output port 137. The CPU 204 switches on any one of the LED driving transistors 117, 118 and 119. Current restricting resistances 126, 127 and 128 are chosen in such a way that their resistance values R126, R127 and R128 are set R126>R127>R128. When the CPU 204 turns on the LED driving transistor 116, the brightness of the blue color LED 103 becomes the darkest state. When the CPU 204 switches on the LED driving transistor 118, the brightness of the blue color LED 103 becomes the lightest state. When the CPU 204 turns on the LED driving transistor 119, the brightness of the blue color LED 103 becomes an intermediate state between the above cases.

Through these operations, in this embodiment of the back-light display device, the brightness of the red color, green color and blue color LEDs 101, 102 and 103 are appropriately controlled for selecting a desired back-light color of a portable telephone.

Next, referring to the drawings, a preferred embodiment according to the present invention will be described in detail below. The present invention is capable of maintaining intensity of brightness regardless of a displayed color as well as displaying a desired color.

Figure 3:
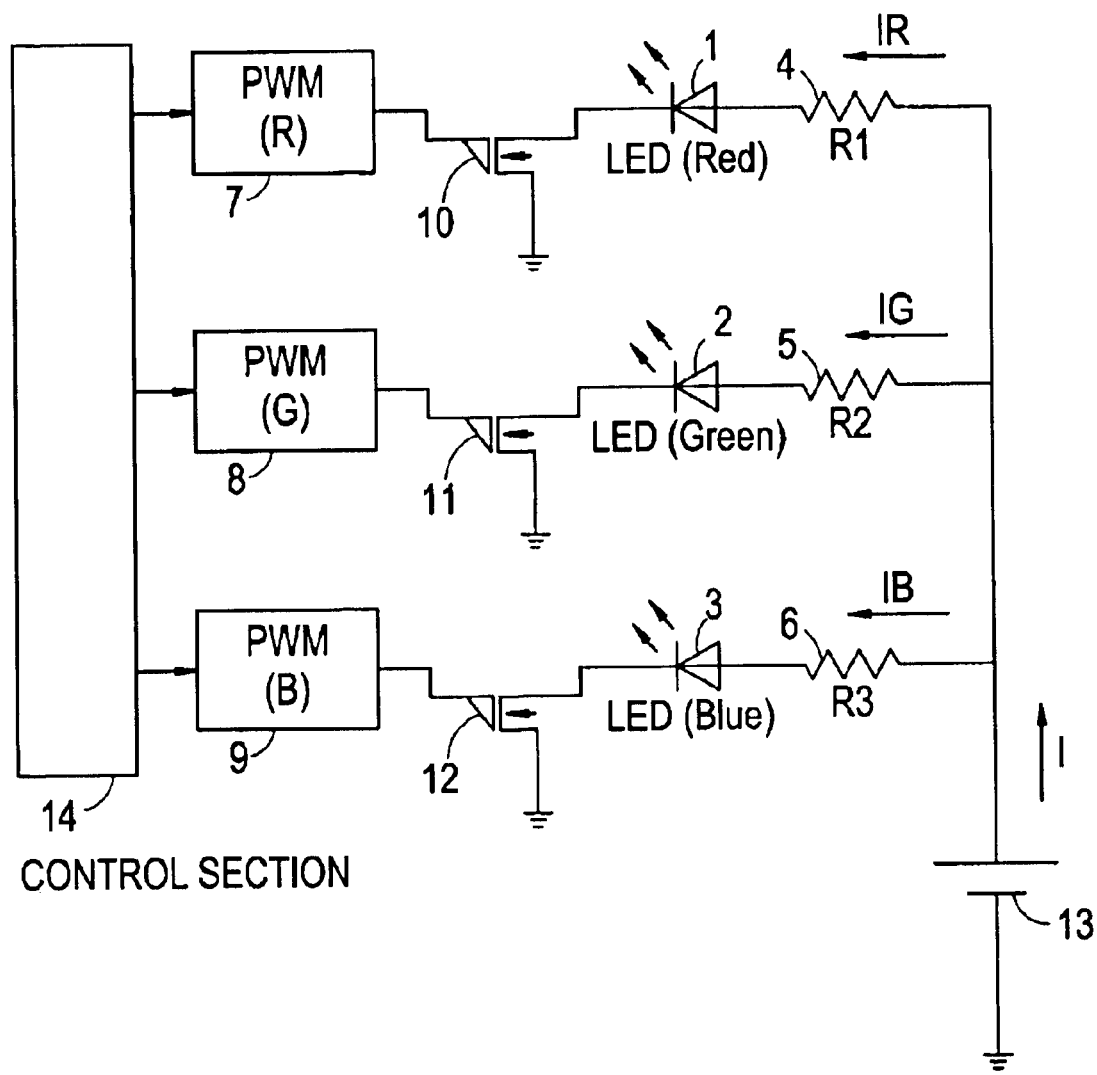
FIG. 3 is a circuit diagram of an embodiment of an RGB back-light display device for a portable electronic device according to the present invention.

A preferred embodiment of an RGB back-light display device for a portable electronic device such as a portable telephone according to the present invention is illustrated in FIG. 3. According to FIG. 3, current flowing through a red color light emitting diode (LED) 1 is controlled by a resistance (R1) 4. The LED 1 is driven by a field effect transistor (FET) switch 10. The FET switch 10 is controlled by a pulse width modulator (PWM) 7. Similarly, current flowing through a green color light emitting diode (LED) 2 is controlled by a resistance (R2) 5. The LED 2 is driven by a field effect transistor (FET) switch 11. The FET switch 11 is controlled by a pulse width modulator (PWM) 8. Current flowing through a blue color light emitting diode (LED) 3 is controlled by a resistance (R3) 6. The LED 3 is driven by a field effect transistor (FET) switch 12. The FET switch 12 is controlled by a pulse width modulator (PWM) 9. A control section 14 controls the timing of signals delivered by the PWMs 7, 8 and 9 to switch the FETs 10, 11 and 12 respectively. The duty cycle of rectangular waves of the signals generated from the PWMs 7, 8 and 9 is also controlled by the control section 14. A direct-current (DC) source 13 supplies power to the LEDs 1, 2 and 3.

The state under which all the LEDs 1, 2 and 3 are turned off will be described with reference to FIG. 3. The PWM 7 delivers a control signal at a low level to the FET 10. In this case, the drain terminal of the FET 10 is open, and thus current from the DC source 13 will not flow through resistance 4 and the LED 1. It causes the LED 1 to be inactivated. Similarly, the PWM 8 delivers a control signal at a low level to the FET 11. In this case, the drain terminal of the FET 11 is open, and thus current from the DC source 13 will not flow through resistance 5 and the LED 2. It causes the LED 2 to be inactivated. Further, the PWM 9 delivers a control signal at a low level to the FET 12. In this case, the drain terminal of the FET 12 is open, and thus current from the DC source 13 will not flow through resistance 6 and the LED 3. It causes the LED 3 to be inactivated.

Next, the state under which the LEDs 1, 2 and 3 are switched on will be described with reference to FIG. 3. The PWM 7 delivers a control signal at a high level to the FET 10. In this case, the drain terminal of the FET 10 is shunted, and thus current from the DC source 13 will flow through resistance 4 and the LED 1. It causes the LED 1 to be activated. Similarly, the PWM 8 delivers a control signal at a high level to the FET 11. In this case, the drain terminal of the FET 11 is shunted, and thus current from the DC source 13 will flow through resistance 5 and the LED 2. It causes the LED 2 to be activated. Further, the PWM 9 delivers a control signal at a high level to the FET 12. In this case, the drain terminal of the FET 12 is shunted, and thus current from the DC source 13 will flow through resistance 6 and the LED 3. It causes the LED 3 to be activated. When the PWM 7 delivers the control signal at a high level to the FET 10, and if supply voltage of DC source 13 is represented by "E", the right-direction voltage drop across the LED 1 is represented by "V1", and the resistance value of resistance 4 is represented by "R1", current flowing thorough the LED 1, wherein it is represented by "IR", is shown as the following equation (1):

$$IR=(E-V1)/R1 \qquad \text{Equation (1)}$$

When the PWM 8 delivers the control signal at a high level to the FET 11, and if supply voltage of DC source 13 is represented by "E", the right-direction voltage drop across the LED 2 is represented by "V2" and the resistance value of resistance 5 is represented by "R2", current flowing thorough the LED 2, wherein it is represented by "IG", is shown as the following equation (2):

$$IG=(E-V2)/R2 \qquad \text{Equation (2)}$$

When the PWM 9 delivers the control signal at a high level to the FET 12, and if supply voltage of DC source 13 is represented by "E", the right-direction voltage drop across the LED 3 is represented by "V3", and the resistance value of resistance 6 is represented by "R3", current flowing thorough the LED 3, wherein it is represented by "IB", is shown as the following equation (3):

$$IB=(E-V3)/R3 \qquad \text{Equation (3)}$$

If, in this embodiment, V1=V2=V3=V0 (Equation (4)), or right-direction voltage drops across the LEDs 1, 2 and 3, respectively, are all equal to "V0", currents flowing through the LEDs 1, 2 and 3 are shown based on equations (1), (2), (3) and (4) as follows:

$$IR=(E-V0)/R1 \qquad \text{Equation (5)}$$

$$IG=(E-V0)/R2 \qquad \text{Equation (6)}$$

$$IB=(E-V0)/R3 \qquad \text{Equation (7)}$$

For rendering intensity of light emitted by the LEDs 1, 2 and 3 substantially equal (a constant value), it is necessary to render values of the current following through the LEDs 1, 2 and 3 substantially equal, or IR=IG=IB. If R1=R2=R3= R0.(Equation (8)), wherein "R0" is a constant value, currents flowing through the LEDs 1, 2 and 3 are shown based on equations (5), (6), (7) and (8) as follows:

$$IR=(E-V0)/R0 \qquad \text{Equation (9)}$$

$$IG=(E-V0)/R0 \qquad \text{Equation (10)}$$

$$IB=(E-V0)/R0 \qquad \text{Equation (11)}$$

Thus, the intensities of light emitted by the LEDs 1, 2 and 3 are substantially equal to each other.

If the duty values of control signals delivered by the PWM 7, 8 and 9 are "a", "b" and "c", respectively, the sum of average current "I" flowing through each LED is derived from Equations (9), (10) and (11) as follows:

$$I=IR \times a+IG \times b+IB \times c=(a+b+c) \times (E-V0)/R0 \qquad \text{Equation (12)}$$

In this embodiment, the resistance values "R1", "R2" and "R3", the right-direction voltage drop "V1", "V2" and "V3" and the duty values "a", "b" and "c" are set or controlled such that the sum of the average current "I" becomes a constant value, or maintained at a predetermined value.

Figure 4A:
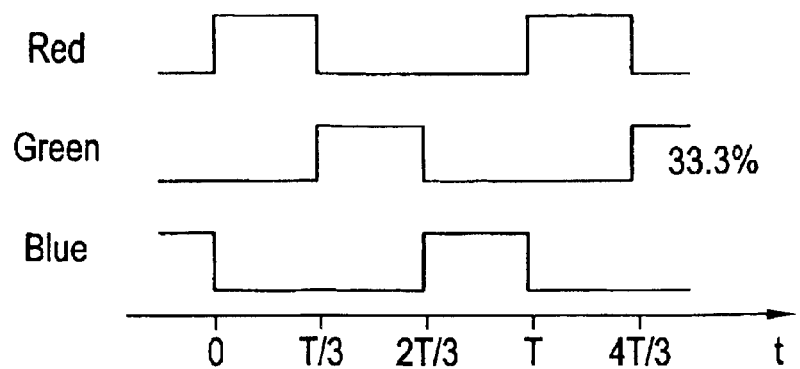
FIG. 4A is a timing chart showing control a signals output from pulse width modulation circuits described in FIG. 3 when all light emitting diodes are activated.
Figure 4B:
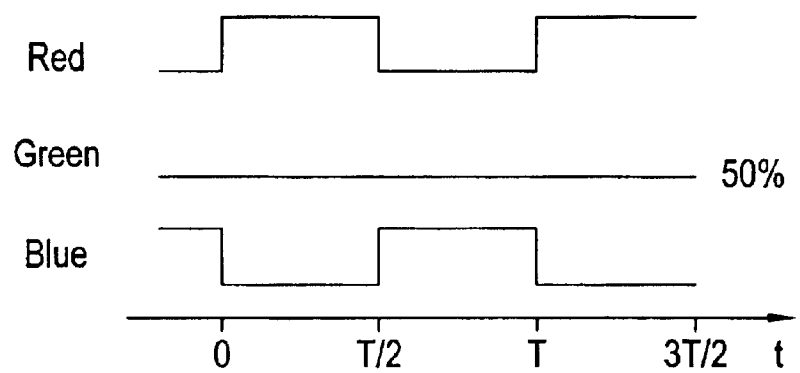
FIG. 4B is a timing chart showing control signals output from pulse width modulation circuits described in FIG. 3 when two light emitting diodes are activated and one light emitting diode is inactivated.
Figure 4C:
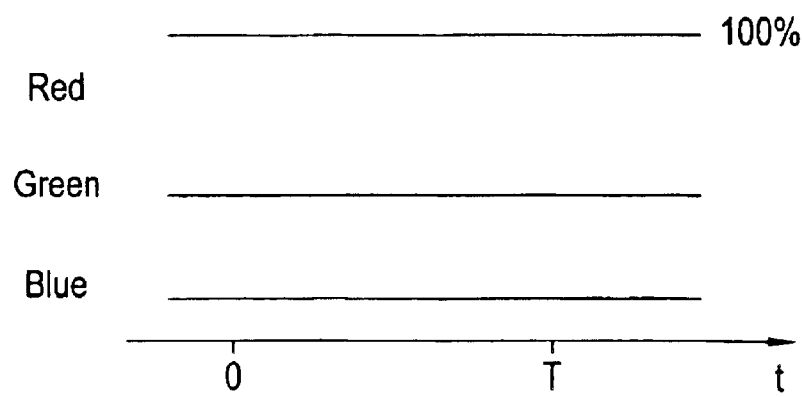
FIG. 4C is a timing chart showing control signals output from pulse width modulation circuits described in FIG. 3 when one light emitting diode are activated and two light emitting diodes is inactivated.

FIGS. 4A, 4B and 4C give time charts of control signals delivered by the PWMs 7, 8 and 9 to switch the FETs 10, 11 and 12, respectively. The control section 14 controls the PWMs 7, 8 and 9 according to operation by a user for displaying color image desired by the user.

FIG. 4A gives a timing chart of control signals delivered by respective PWMs 7, 8 and 9, when all the LEDs 1, 2 and 3 are activated.

It is assumed here that the pulse periods of control signals delivered by the PWMs 7, 8 and 9 are equal to "T", and every control signal has a pulse width of "T/3", or each duty value is equal to 33% of rectangular wave indicative of every control signal. It is further assumed that the rising time "t" of a pulse representing the control signal delivered by the PWM 7 is taken as reference (t=0), the rising time "t" of a pulse representing the control signal from the PWM 8 is t=T/3, and the rising time "t" of a purse representing the control signal from the PWM 9 is t=2T/3. Then, the sum of the average current "I" flowing through each LED is derived from Equation (12) as follows:

$$I=(0.33+0.33+0.33) \times (E-V0)/R0 = (E-V0)/R0 \qquad \text{Equation (A)}$$

FIG. 4B is a timing chart of the control signals delivered by the PWMs 7, 8 and 9 when two LEDs are activated. It is assumed here as an illustration that the LEDs 1 and 3 are activated while the LED 2 is not activated, whereby images with deferent color from that in the case shown in FIG. 4A are displayed.

It is further assumed here that the pulse periods of control signals delivered by the PWMs 7 and 9 are equal to "T", and each of the control signals delivered by the PWMs 7 and 9 has a pulse width of T/2, or each duty value of the control signals delivered by the PWMs 7 and 9 is equal to 50% of a rectangular wave indicative of each control signal. It is still further assumed that the rising time "t" of a pulse representing the control signal delivered by the PWM 7 is taken as reference (t=0), the rising time "t" of a pulse representing the control signal from the PWM 9 is t=T/2, and the control signal delivered by the PWM 8 always remains at a low level. Then, the sum of the average current "I" flowing through each LED is derived from Equation (12) as follows:

$$I=(0.50+0.50) \times (E-V0)/R0 = (E-V0)/R0 \qquad \text{Equation (B).}$$

FIG. 4C gives a timing chart control signals delivered by the PWMs 7, 8 and 9 when a single LED is activated. It is assumed here as an illustration that the LED 1 is activated while the LEDs 2 and 3 are not activated, whereby images with deferent color from that in the case shown in FIGS. 4A and 4B are displayed.

It is further assumed here that the control signal delivered by the PWM 7 always remains at a high level. It is still further assumed that the control signals delivered by the PWMs 8 and 9 always remain at a low level. Then, the sum of the average currents flowing through each LED is derived from Equation (12) as follows:

$$I=(1+0+0) \times (E-V0)/R0 = (E-V0)/R0 \qquad \text{Equation (C).}$$

As seen from above, the control section 14 controls the PWMs 7, 8 and 9 so that they may deliver control signals at the timing as depicted in FIGS. 4A, 4B and 4C to change color of images to be displayed. Then, the sum of the average current "I" flowing through each LED becomes constant as indicated in Equations (A), (B) and (C), and hence the intensity of brightness in any given display color can be maintained at constant.

As described above, the back-light display device according to the present invention maintains a constant light intensity regardless of what color is displayed and the color presents high quality images suitable to a viewer. Further, even if the displayed color is changed according to operation by a user, its light intensity is maintained at a predetermined value.

Figure 5:
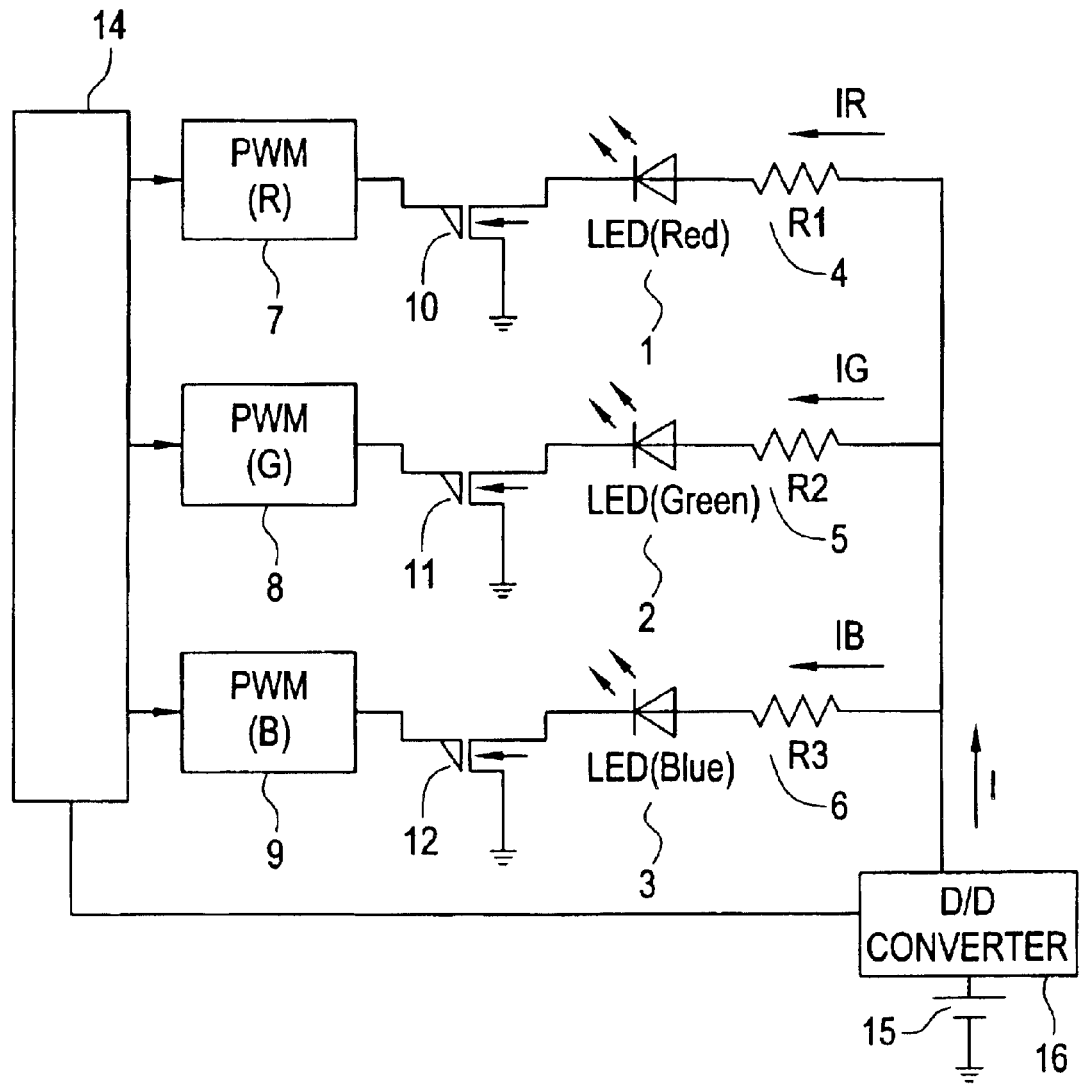
FIG. 5 is a circuit diagram showing another embodiment of an RGB back-light display device for a portable device according to the present invention.

With reference to FIG. 5, another embodiment of an back-light display device for an electronic device such as a portable telephone according to the present invention will be discussed below.

The back-light display device shown in FIG. 5 is the same with that shown in FIG. 3 except that the DC power source 13 is replaced with a DC/DC converter 16 and a DC power source 15 for the DC/DC converter 16.

Hence, the back-light display device provided by this embodiment includes an LED 1, a resistance 4 to control current flowing through the LED 1, an FET 10 to drive the LED 1, and a PWM 7 to control the FET 10. Similarly, it has an LED 2, a resistance 5 to control current flowing through the LED 2, a FET 11 to drive the LED 2, a PWM 8 to control the FET 11, an LED 3, a resistance 6 to control current flowing through the LED 3, a FET 12 to drive the LED 3, and a control section 14 to control the timing of control signals delivered by the PWMs 7, 8 and 9 to the FETs 10, 11 and 12 and the duty values of rectangular waves. In addition, the back-light display device has the DC power source 15 to supply power to the LEDs 1, 2 and 3, and the DC/DC converter 16 to control the power supplied to the LEDs 1, 2 and 3.

In FIG. 5, the timing of control signals delivered by the PWM 7, 8 and 9 to the FETs 10, 11 and 12 respectively is the same as shown in FIGS. 4A, 4B and 4C. When a control signal from at least one of the PWMs 7, 8 and 9 is at a high level, control section 14 can deliver a control signal to the DC/DC converter 16 in order to raise output voltage "E" from the DC/DC converter 16. Then, the sum of the average current "I" becomes larger than that shown in the Equation (12) and the intensity of brightness of a displayed color can be strengthened or brightened.

Likewise, when a control signal from at least one of PWMs 7, 8 and 9 is at a high level, control section 14 can deliver a control signal to the DC/DC converter 16 in order to lower the output voltage "E" from the DC/DC converter 16. Then, the sum of the average current "I" becomes smaller than that shown in the Equation (12), and the intensity of brightness of a displayed color is weakened or darkened.

According to this embodiment, it is possible for the control section to control supply voltage from the DC power source 15 to the LEDs 1, 2 and 3, thereby to adjust the sum of the average current "I" flowing through each LED. Thus, the level of light intensities of displayed color is adjusted, keeping high quality images suitable to the viewer.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A display device, comprising:
   a plurality of light emitters, each of said light emitters emitting a light different in color from other of said light emitters;
   a power source for supplying power to said light emitters;
   a controller for controlling a current flowing through at least one of said light emitters such that a sum of currents flowing through said light emitters is maintained at a predetermined value, further comprising:
   a plurality of resistors, wherein said resistors are respectively disposed between said power source and said light emitters, and a resistance value of said resistors affects the current flowing through said light emitters;
   wherein the resistance values of said resistors are set to be substantially equal to each other whereby the sum of currents flowing through said light emitters is maintained at the predetermined value.

2. A display device, comprising:
   a plurality of light emitters, each of said light emitters emitting a light different in color from other of said light emitters,
   power source for supplying power to said light emitters; and
   a controller for controlling a current flowing through at least one of said light emitters such that a sum of currents flowing through said light emitters is maintained at a predetermined value;

wherein said controller controls the current flowing through said at least one of said light emitters, whereby the currents do not simultaneously flow through the plurality of said light emitters.

3. A display device, comprising:

a plurality of light emitters, each of said light emitters emitting a light different in color from other of said light emitters;

a power source for supplying power to said light emitters;

a controller for controlling a current flowing through at least one of said light emitters such that a sum of currents flowing through said light emitters is maintained at a predetermined value, wherein said controller includes:

a plurality of switches respectively connected to said light emitters, for individually controlling whether or not the currents are flowing through said light emitters connected thereto; and a plurality of control signal generators for respectively generating a control signal to said switches.

4. The display device as claimed in claim 3, wherein one of said switches includes a field effect transistor.

5. The display device as claimed in claim 3, wherein said controller assigns duty values to said control signal generators.

6. The display device as claimed in claim 5, wherein said control signal generators generate the control signals having pulse widths which are based on the duty values assigned by said controller.

7. The display device as claimed in claim 5, wherein a sum of the duty values assigned to said control signal generators is a constant.

8. A display device, comprising:

a plurality of light emitters, each of said light emitters emitting a light different in color from other of said light emitters;

a power source for supplying power to said light emitters;

a controller for controlling a current flowing through at least one of said light emitters such that a sum of currents flowing through said light emitters is maintained at a predetermined value, further comprising:

a converter for adjusting the power supplied to said light emitters from said power source.

9. The display device as claimed in claim 8, wherein said converter increases the power supplied from said power source to increase a brightness of the light emitted from said light emitters.

10. The display device as claimed in claim 8, wherein said converter decreases the power supplied from said power source to decrease a brightness of the light emitted from said light emitters.

* * * * *